(12) United States Patent
Kreider (10) Patent No.: US 11,566,739 B2
(45) Date of Patent: Jan. 31, 2023

(54) QUICK CONNECTION SYSTEM AND METHOD FOR IMPLEMENTATION

(71) Applicant: SOGEFI AIR & COOLING, Guyancourt (FR)

(72) Inventor: Julien Kreider, Altorf (FR)

(73) Assignee: SOGEFI AIR & COOLING, Guyancourt (FR)

( * ) Notice: Subject to any disclaimer, the term of this patent is extended or adjusted under 35 U.S.C. 154(b) by 537 days.

(21) Appl. No.: 16/456,879

(22) Filed: Jun. 28, 2019

(65) Prior Publication Data

US 2020/0003350 A1    Jan. 2, 2020

(30) Foreign Application Priority Data

Jun. 29, 2018  (FR) ...................................... 1855937

(51) Int. Cl.
| | | |
|---|---|---|
| *F16L 37/14* | (2006.01) | |
| *F02M 35/10* | (2006.01) | |
| *F16L 37/084* | (2006.01) | |
| *F16L 37/088* | (2006.01) | |

(52) U.S. Cl.
CPC ..... *F16L 37/144* (2013.01); *F02M 35/10144* (2013.01); *F16L 37/088* (2013.01); *F16L 37/0841* (2013.01); *F16L 37/0887* (2019.08)

(58) Field of Classification Search
CPC . F16L 37/144; F16L 37/0885; F16L 37/0841; F16L 2201/10
USPC ......................................................... 285/93
See application file for complete search history.

(56) References Cited

U.S. PATENT DOCUMENTS

| | | | |
|---|---|---|---|
| 3,314,696 A | | 4/1967 | Ferguson et al. |
| 4,167,056 A | | 9/1979 | Nattel |
| 4,884,829 A | | 12/1989 | Schaeffer |
| 5,366,259 A | * | 11/1994 | Hohmann ............. F16L 37/144 |
| 5,876,071 A | | 3/1999 | Aldridge |
| 6,328,344 B1 | * | 12/2001 | Tozaki ........................... 285/93 |
| 6,371,528 B1 | | 4/2002 | Kimura |
| 6,945,137 B1 | | 9/2005 | Hawkins |
| 7,438,328 B2 | | 10/2008 | Mori et al. |
| 2003/0052484 A1 | | 3/2003 | Rautureau |
| 2004/0051313 A1 | | 3/2004 | Trouyet |

(Continued)

FOREIGN PATENT DOCUMENTS

| | | |
|---|---|---|
| DE | 200 15 040 | 12/2000 |
| DE | 10 2011 107 016 | 3/2012 |

(Continued)

*Primary Examiner* — Zachary T Dragicevich
(74) *Attorney, Agent, or Firm* — Nixon & Vanderhye (57) ABSTRACT

A system for quick connection between a female end piece provided with a U-shaped locking clip and a male end piece fitted therein, the wall of the female end piece having opposite slits through which the arms of the U-shaped locking clip protrude into the passage of the end piece and the wall of the male end piece having an outer groove lockably receiving the clip arms in a final fitted state of the male piece in the female piece, locked by the clip. Also included is a part forming a removable prestressing element for the clip with housing sites engaging the two free sections in a first resting configuration, and in at least a second prestressed configuration in which the arms are more separated than in the resting configuration but less than during the passage of the maximum outer section of the male end piece.

13 Claims, 4 Drawing Sheets

(56) References Cited

U.S. PATENT DOCUMENTS

| | | | | |
|---|---|---|---|---|
| 2006/0082146 A1* | 4/2006 | Heim | .................... | F16L 37/144 |
| 2008/0231045 A1* | 9/2008 | Trede | .................... | F16L 37/144 |
| | | | | 285/93 |
| 2012/0104746 A1* | 5/2012 | Fansler | ............... | F16L 37/0885 |
| 2017/0363237 A1* | 12/2017 | Pepe | ................... | F16L 37/0885 |
| 2020/0166167 A1* | 5/2020 | Hagen | ................ | F16L 37/0885 |

FOREIGN PATENT DOCUMENTS

| | | |
|---|---|---|
| GB | 336 589 | 10/1930 |
| KR | 20-2010-0010081 | 10/2010 |

\* cited by examiner

QUICK CONNECTION SYSTEM AND METHOD FOR IMPLEMENTATION

BACKGROUND OF THE INVENTION

Field of the Invention

This invention relates to the field of connection between elements subjected to a flow-through of fluid, particularly gaseous, and in particular in a framework of equipment for automotive vehicles, and advantageously in an application for connecting a pipe of the compressed-air pipe type.

More specifically, the invention has as its object a quick connection system, a removable prestressing part for such a system, a pipe or tube element equipped with such a part, and a method for making a quick connection using the above-described system.

Description of the Related Art

The quick connection systems, also called quick connectors, referred to herein are well known in the state of the art (see, for example: U.S. Pat. Nos. 3,314,696; 4,884,829; 5,876,071; 6,371,528; US 2003/005 2484; U.S. Pat. No. 7,438,328).

In a generic way, such a quick connector comprises a female end piece (for example made of plastic) on which is mounted a locking clip or ring (generally made of spring steel), having a general "U" shape (optionally with arms that are more or less straight, rounded or converging).

This female end piece also has at least two approximately opposite slits through which the arms of the clip protrude inside the passage opening of the female end piece. The male end piece is designed to be inserted and to be fitted into the female end piece and comprises an outer groove. During the insertion of the male end piece, the arms of the clip are separated (elastic deformation) by the thrust exerted by the male end piece on said arms, then they return to their resting position in the groove of the male end piece. In this position, the disconnection of the male/female fitting is prevented by the retaining of the clip in the groove of the male end piece.

In the state of the art, the clip is engaged in the resting position, and it is the operator who, by pushing the male end piece into the female end piece, separates the arms of the clip before their return to the resting position in the groove of the male end piece in the final fitting state. It is therefore the operator who is responsible for 100% of the mounting force.

Supplying such a force repeatedly is not satisfactory from an ergonomic point of view.

Figure 1A:
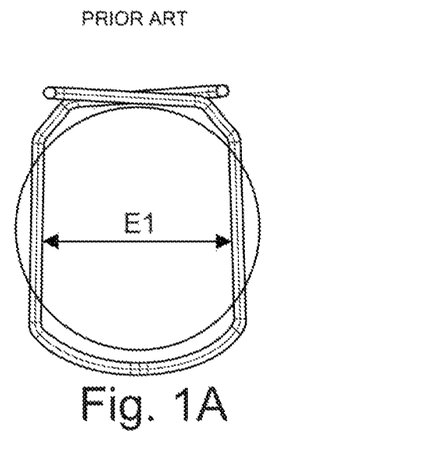
FIGS. 1A and 1B illustrate characteristics of the prior art.
Figure 1B:
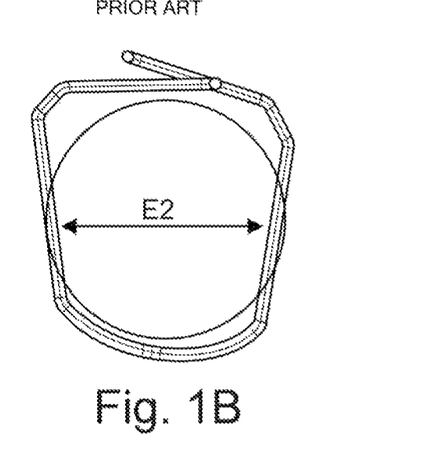

FIGS. 1A and 1B illustrate, transparently and by way of example, the deformation undergone by a clip during the insertion of the male end piece into the female end piece (the separation halfway up the arms of the clip goes from a separation E1—for example ≈39 mm—to a separation E2—for example ≈47 mm—, during the passage of the largest section of the male element, generally just before the groove).

It will be noted that the engagement of the clip in the groove takes place audibly and makes it possible for the operator to have confirmation of the locking of the connection, without other verification, particularly visual.

By the document DE 10 2011 107 016, moreover, a tool is known to unlock easily a locking ring by elastic engagement of a quick connector, by forcing said ring into a constrained configuration that makes it possible to release the connection between the male and female end pieces.

Although the use of this tool during the assembling of the end pieces makes it possible to reduce the thrust force to be exerted on the male end piece during the assembling, it clearly complicates the assembling operation for the operator.

Similar solutions, i.e., using a tool to act on the clip at the time of the assembling and to facilitate this assembling, are known from documents DE 200 15 040 and GB 336 589.

In addition, in these known solutions with the use of a tool, no preparation upstream from the assembling is possible since the intervention of the operator is required during the assembling to manipulate the tool (in addition to the making of the male/female fitting).

SUMMARY OF THE INVENTION

The main object of the invention is to propose a mechanical system for quick connection that makes it possible to reduce significantly the forces to be furnished by the operator to achieve the mutual insertion and fitting of the two end pieces, while not complicating the actions to be performed, i.e., while avoiding an additional manipulation during the assembling, and while keeping the auditory assistance (clicking) for verification of the locking.

The invention relates more particularly to a system for quick connection between a female end piece provided with a U-shaped locking clip and a male end piece designed to be fitted into the female end piece, the wall of the female end piece having opposite slits through which the arms of the U protrude into the passage of said end piece and the wall of the male end piece having an outer groove designed to receive, with locking, said arms of the clip in a final fitting state of the male end piece in the female end piece, locked by said clip, a free section extending respectively each arm of the U in the direction of the other arm, these sections closing the U thus approximately by working together. These arms are, as mentioned previously, separated more by elastic deformation by the male end piece during its insertion into the female end piece until the clip is received in the groove in the final fitted state of the two end pieces, the clip then being approximately in a resting configuration, with the arms of the U not forced apart.

In this type of system, the forced separation of the arms of the clip is obtained by squeezing or by bringing closer the free ends of the sections extending said arms and each extending in the direction of the other arm of the U (FIGS. 1A and 1B).

The aforementioned object is attained by the invention for such a system by the fact that it further comprises an added part that forms a removable prestressing element for the clip and that comprises housing sites able and intended to work by engagement with the two free sections in a first configuration corresponding to the resting configuration of the clip and in at least a second prestressed configuration of the clip in which the arms of the U are more spaced apart than in the resting configuration but less spaced apart than during the passage of the maximum outer section of the male end piece during its insertion into the female end piece, the housing sites being arranged on the added prestressing part in such a way that during the insertion of the male end piece, and before reaching the final fitted state, the clip prestressed by said part is automatically released from its prestressed configuration and can return to its resting configuration.

BRIEF DESCRIPTION OF THE DRAWINGS

The invention will be better understood as a result of the description below, which relates to a preferred embodiment, given by way of nonlimiting example, and explained with reference to the accompanying schematic drawings, in which.

DESCRIPTION OF THE PREFERRED EMBODIMENTS

Figure 2A:
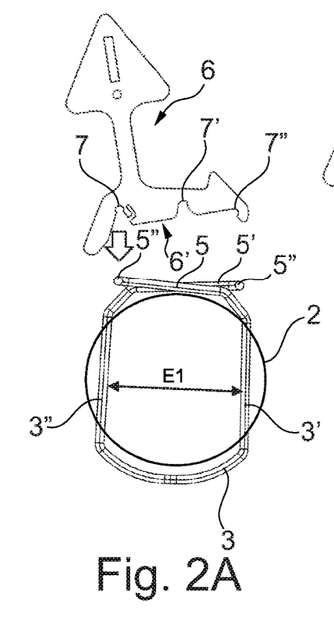
FIGS. 2A to 2C illustrate, transparently and similarly to FIGS. 1, the different phases of installation and of use for an added prestressing part on a female end piece that is part of a quick connection system according to the invention.
Figures 2B, 2C:
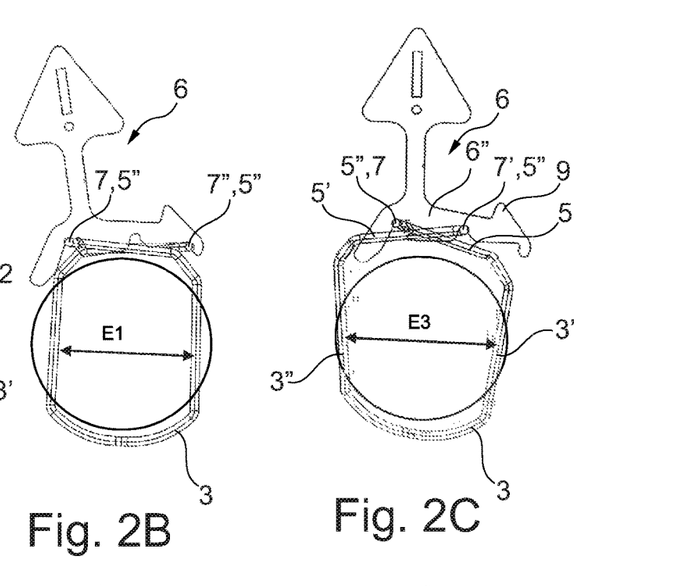
Figures 3A, 3B, 7:
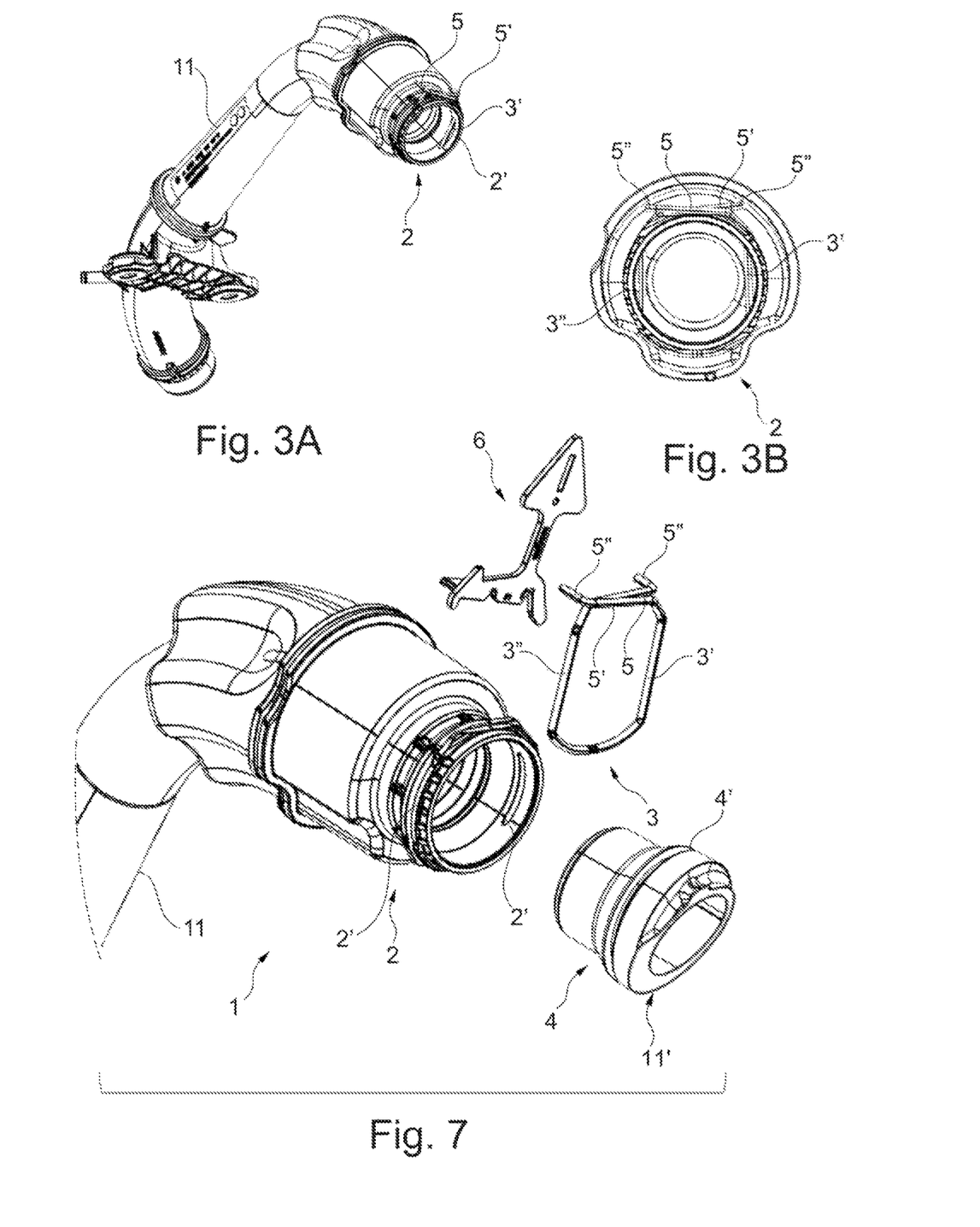
FIG. 3A is a view in perspective of an air pipe provided with a female end piece as represented in FIGS. 2.
FIG. 3B is a front elevation view of the female end piece on a different scale, before use of the prestressing part.
FIG. 7 is an exploded view in perspective showing the different components constituting the system according to the invention.

FIGS. 2, 4, 6 and 7, and partially FIGS. 3, illustrate a system 1 for quick connection between a female end piece 2 provided with a U-shaped locking clip 3 and a male end piece 4 designed to be fitted into the female end piece 2. The wall of the female end piece 2 has opposite slits 2' through which the arms 3', 3" of the U protrude into the passage of said end piece 2, and the wall of the male end piece 4 has an outer groove 4' designed to receive, with locking, said arms 3', 3" of the clip 3 in a final fitting state of the male end piece 4 in the female end piece 2, locked by said clip 3. A free section 5, 5' extends respectively each arm 3', 3" of the U in the direction of the other arm 3", 3', by approximately closing the U by working together. Said arms 3', 3" are separated elastically by the male end piece 4 during its insertion into the female end piece 2 until the clip 3 is received in the groove 4' in the final fitted state of the two end pieces 2 and 4, the clip 3 then being approximately in a resting configuration, with the arms 3', 3" of the U not forced apart.

According to the invention, this system 1 further comprises an added part 6 that forms a removable prestressing element for the clip 3 and that comprises housing sites 7, 7', 7" able and intended to work by engagement with the two free sections 5, 5' in a first configuration corresponding to the resting configuration of the clip 3 and in at least a second prestressed configuration of the clip 3 in which the arms 3', 3" of the U are more separated than in the resting configuration but less separated than during the passage of the maximum outer section of the male end piece 4 during its insertion into the female end piece 2. The housing sites 7, 7', 7" are arranged on the added prestressing part 6 in such a way that during the insertion of the male end piece 4, and before reaching the final fitted state, the clip 3 prestressed by said part 6 is automatically released from its prestressed configuration and can return to its resting configuration.

As a result of the aforementioned arrangements of the invention, it is therefore possible, immediately after positioning the clip 3 and, in any case, before insertion of the male end piece 4 to achieve the connection, to propose a simple solution making it possible to precondition the clip 3, while securing it in a prestressed (pre-opening) configuration, this to reduce the extent of the movement of separation having to be generated by the invention, of the male end piece 4, and therefore to reduce proportionally the thrust force to be furnished by the operator, this without using any tool during the assembling operation itself.

The extent of this forced preliminary separation of the arms 3', 3" (separation E3) imposed by the prestressing part 6 is determined to reduce significantly the mounting force, while guaranteeing a certain disengagement of the prestressed configuration (E2>E3) and the possibility of a return to the resting configuration for the clip 3 before the latter ends up at the height of the outer groove 4' of the male end piece 4 (final fitted state) during the insertion movement of this end piece. In other words, the noise of elastic engagement of the clip 3 in the groove 4' is kept, as well as the automatic locking of the resulting connection.

In addition to its simple and inexpensive implementation, the solution according to the invention makes it possible to precondition the clip 3 of the female end piece 2 at the supplier of the latter and to deliver it in this state on the site of its assembling with the male end piece 4.

Thus, the invention proposes a solution using a prestressed part of a clip, pre-mounted with this clip on the female end piece and which is released automatically during the insertion of the male end piece (in which, moreover, it facilitates the introduction in terms of force).

Consequently, the prestressing part of the invention is pre-mounted and secured temporarily with the female end piece (pre-mounted and user-manipulatable subassembly: female end piece+clip+prestressing part), no positive action on the clip on the part of an operator being necessary during the assembling to separate and then to release the clip (and therefore to lock the assembly).

Of course, different embodiments are possible for the prestressing part 6. It should, however, be inexpensive, of reduced bulk and of a simple design, while being suited optimally to the functions to be performed and to its use environment.

Figure 5:
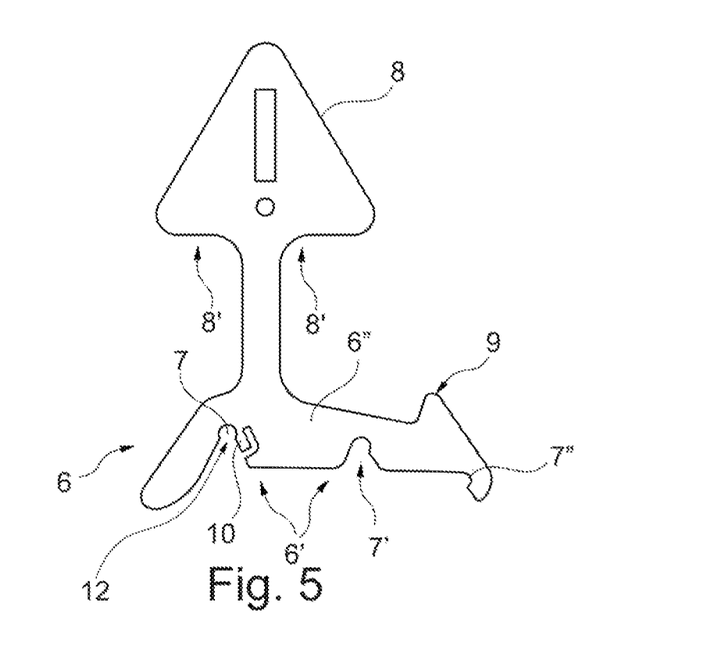
FIG. 5 is a plan elevation view of a prestressing part that is part of the invention.
Figure 6:
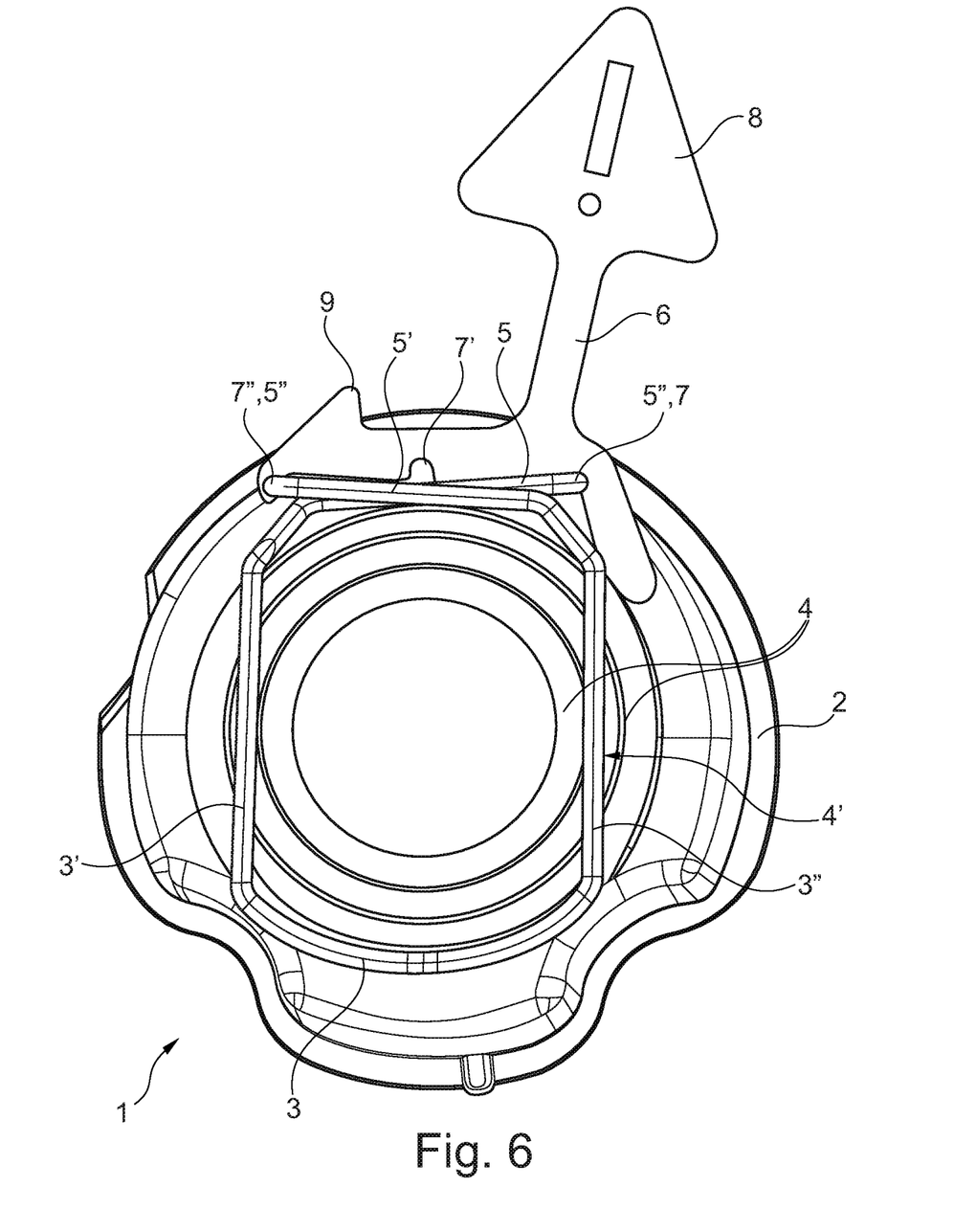
FIG. 6 is a view in a direction opposite to that of FIGS. 2 and 4 and in cutaway along a plane containing the body of the clip of the fitting and connection area between the male and female end pieces after completion of the assembling operation and immediately before removal of the prestressing part.

Consistent with the aforementioned requirements and according to a preferred embodiment of the invention, reflected in particular in FIGS. 3 and 5, the added prestressing part 6 can consist of a plate having an edge 6' with a functional contour, and the housing sites 7, 7', 7" can consist of re-entrant formations or cutouts that are able and designed to receive, with removable clamping, the ends 5" of the free sections 5, 5' that extend the arms 3', 3" of the U-shaped clip 3, the housing sites 7, 7', 7" having shapes partially matching those of said ends of the two free sections 5, 5'.

According to an advantageous characteristic, said added prestressing part 6 has at least one grasping formation or appendage 8, 9 making possible its placement on the clip 3, its removal from the clip 3, and its movement when it is engaged with the clip 3. Preferably, the passage of the latter from its resting configuration to its prestressed configuration takes place by forced movement of said part 6 engaged with the clip 3 and the passage of the latter from the prestressed configuration to the resting configuration being accomplished automatically under the effect of an elastic return of the arms 3', 3" of the U-shaped clip 3, after separation of the latter beyond the separation imposed by the part 6 in the prestressed configuration.

Thus, the functional contour of the edge 6' of the part 6 is designed in such a way that, on the one hand, the free sections 5, 5' remain, as a function of the configuration, in the corresponding housing sites 7, 7', 7" involved in elastic hooking/hold (spring action of the arms 3', 3"), and in such a way that, on the other hand, said free sections 5, 5' are guided and forced (by movement) into an arrangement corresponding to the resting configuration after release/disengagement from the prestressed configuration.

In keeping with an optimized practical design, it can be provided that the part 6 comprises a first housing site 7 intended to receive, with elastic locking and wedging, the end 5" of a first section 5 of the clip 3, a second housing site 7' intended to receive with forced wedging, under the elastic stress of the prestressed clip 3, the end 5" of the second section 5' in the prestressed configuration of the clip 3, and a third housing site 7" intended to receive, with a loose hooking, the end 5" of the second section 5' in the resting configuration of the clip 3, the third site 7" being farther from the first site 7 than the second site 7'.

Preferably, the first section 5 is held in the first housing site 7 by a deformable contour part 10 of said site 7, preferably a cutout plate portion forming a flexible lip or finger elastically retaining the end of the first section 5 in said first housing site 7, by narrowing its opening 12.

This part 10 forming an elastically deformable lip or finger thus provides an opening 12 narrowed at the housing site 7, i.e., an opening 12 whose width is at least slightly less than the diameter of the section 5, but that nevertheless allows the passage of said section 5 when a removal force is applied on the part 6. Said part 10 is thus conceived and configured (a portion that is cut out and deformed to constitute an inverted comma or apostrophe) to perform a dual function during the use of the prestressing part 6, namely:

i—until the end of the mounting: this lip (or finger 10) ensures a continuous sliding pivot connection until the removal phase of the part 6. Consequently, a solid hold is ensured, resistant to transport and mounting stresses. The narrowing in the area of the opening 12 is designed to ensure the insertion of the section into said housing 7 without having to laminate the material.

ii—during the removal phase: the flexibility of the finger-like or lip-like part 10 makes possible a withdrawal of the part 6 with an ergonomically acceptable force.

This local weakening in the area of the first housing site 7 (with the creation of a deformable finger or lip 10 in the area of the opening 12 and on a part of the housing 7 located on the side near to the other housings 7' and 7") contributes as well to the automatic return to the resting configuration of the clip 3, this after passage of the maximum section of the male location, release from the prestressed configuration (by means of a rotation of the section 5 in the site 7) and engaging in the groove 4'.

According to a practical embodiment that is simple, low-cost and suitable for combined use, the added prestressing part 6 is advantageously a part in the form of a plate in one piece, preferably molded from thermoplastic or thermoset material. The body 6" of this plate has, on one side, an edge 6' that has a functional contour that incorporates at least three housing sites 7, 7', 7" that are mutually spaced apart and intended to receive the ends 5" of the free sections 5, 5' of the clip 3 as a function of the latter's configuration type and, on the other hand, a first grasping appendage 8 for manipulation, in particular the placing and the removal, of said added part 6 by an operator and a second grasping appendage 9 for a movement of said added part 6 by a robotic system, particularly a robotic arm.

To remind the operator to remove the part 6 at the end of the mounting operation, the first grasping appendage 8 can have the shape of a pictogram, in particular of a visual warning pictogram, optionally made of a bright-colored material, in particular red, while having easy interfacing areas 8' for fingers, facilitating a removal operation by pulling.

The invention also has as its object a prestressing part 6 that is intended to be used in a quick connection system 1 as described above, and to be part of it temporarily. This part 6 is characterized in that it consists of a plate intended to be engaged with a U-shaped locking clip 3, mounted on the female end piece 2 of said quick connection system 1 and comprising housing sites 7, 7', 7" that are able and designed to work by engagement with free sections 5, 5' that extend the two arms 3', 3" of the clip 3, in such a way as to define with the latter, on the one hand, a first configuration corresponding to a configuration of resting for the clip 3 and of locking for the quick connection system 1 in the final fitted state of the male and female end pieces 4 and 2, and, on the other hand, at least a second prestressed configuration of the clip 3 in which the arms 3', 3" of the U are more separated than in the resting configuration but less separated than during the passage of the maximum outer section of the male end piece 4 during its insertion into the female end piece 2. The housing sites 7, 7', 7" are arranged on the added prestressing part 6 in such a way that during the insertion of the male end piece 4, and before attaining the final fitted state, the clip 3 prestressed by said part 6 is automatically released from its prestressed configuration and can return to its resting configuration.

According to an advantageous practical variant embodiment, the prestressing part 6 consists of a part in the form of a plate in one piece, preferably obtained from molding of thermoplastic or thermoset material, the body 6" of this plate having, on the one hand, an edge 6' with a functional contour that incorporates at least three housing sites 7, 7', 7" that are mutually spaced apart and intended to receive the ends 5" of the free sections 5, 5' of the clip 3 as a function of the latter's configuration type, and, on the other hand, a first grasping appendage 8 for manipulation, in particular the placing and the removal, of said added part 6 by an operator and a second grasping appendage 9 for a movement of said added part 6 by a robotic system, particularly a robotic arm, the housing sites 7, 7', 7" having openings 12 that are directed opposite the direction of extension of the appendage 8 for grasping the prestressing part 6 by an operator.

The body 6" of the part 6 thus has a base with the functional contour edge 6' and the sites 7, 7', 7", which are intended to interact with the clip 3, and an upper portion provided with the aforementioned appendages 8 and 9.

Said body 6" advantageously has a certain thickness to have a rigid enough makeup and to guarantee a secure receiving of the ends 5" of the sections 5, 5'. These ends can consist of portions that are folded (perpendicular to the general plane of the clip 3) of the folded metal wire forming said clip 3 and optionally have thickenings or overmoldings.

The part 6 is thus mounted in a plane parallel to the plane of the arms 3', 3" of the clip 3, but offset in relation to the latter. In addition, when it is mounted on the clip 3, the part 6 can be held laterally by it and optionally by a formation (flange) of the female end piece 2.

The invention also relates, as FIGS. 3A and 3B show in particular, to an element 11 forming a fluid circulation circuit, in particular a tube or pipe, having a female end piece 2 able and designed to be connected by fitting to a male end piece 4 of another element 11' of said circuit by means of a quick connection system 1 as described above. This female end piece 2 is equipped with a clip 3 for locking the connection between the two end pieces 2 and 4 in their mutual final fitting state. This element 11 is characterized in that it is equipped, at least until the final fitting state, with a removable prestressing part 6 of the clip 3, as mentioned above.

Finally, the invention also relates, according to another one of its aspects, to a method for making a connection between two elements 11 and 11' that make up a fluid circulation circuit, a first element 11 having a female end piece 2 equipped with a U-shaped locking clip 3 and the second element 11' having a male end piece 4, said method preferably using a system 1 as described above. This method is characterized in that it consists in providing a prestressing part 6 and with housing sites 7, 7', 7", advantageously as mentioned above, to place it on the female end piece 2 in the resting configuration of the clip 3, by engagement with wedging of the free sections 5, 5' of the two arms 3', 3" of said clip 3 in the two appropriate housing sites 7, 7', 7" of the prestressing part 6, to put the clip 3 under stress by moving the prestressing part 6 so as to mutually separate the arms 3', 3" of the clip 3 until reaching a new position of engagement with wedging for at least one of the sections 5, 5', then inserting the male end piece 4 into the female end piece 2 until reaching the final fitting state in which the arms 3', 3" of the clip 3 are engaged elastically in an outer groove 4' of said male end piece 4, said arms 3', 3" having been separated beyond their determined prestressed configuration by the added part 6 during the insertion of the male end piece 4 and the section or sections 5, 5' automatically returning into the housing site or sites 7, 7', 7" corresponding to the resting configuration of the clip 3, and, finally, removing the prestressing part 6 by pulling.

Figure 4A:
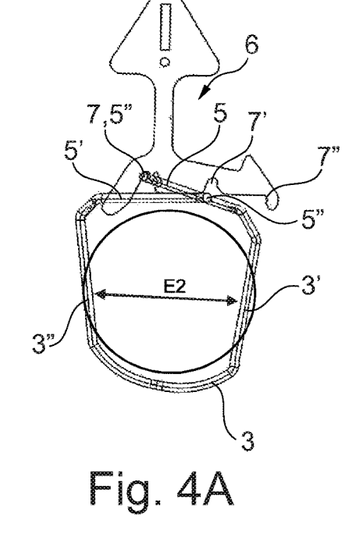
FIGS. 4A to 4C are representations by transparence, similar to those of FIGS. 1 and 2, of the different phases of assembling, with insertion and fitting of the male end piece into the female end piece, of a quick connection system according to the invention.
Figure 4B:
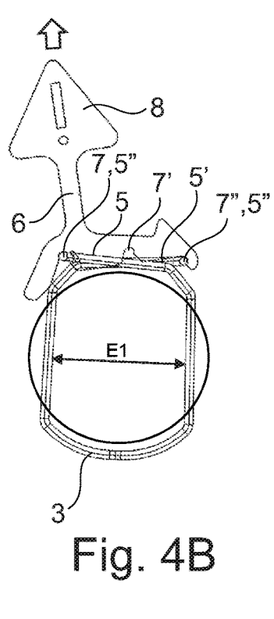

The end 5" of the section 5 is retained in the site 7, and the end 5" of the section 5' is retained in the site 7' under strain by elastic stress (FIG. 2C) and because of the conformations of said sites, while the end 5" of the section 5' is retained in the site 7" because of its hook-like conformation (FIGS. 2B and 4B).

Figure 4C:
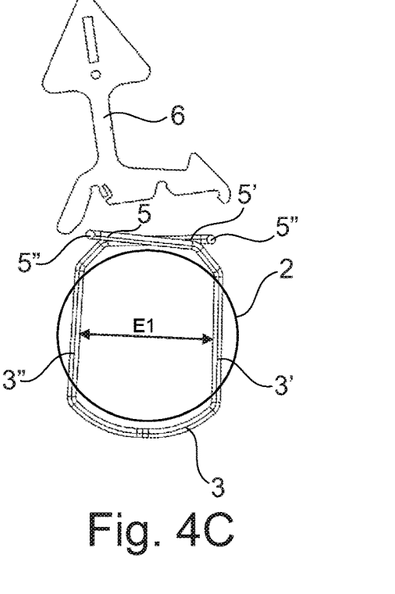

More specifically, the method according to the invention can, for example, comprise the following operating phases:

placing (by an operator) of the part 6 on the clip 3, which has been previously mounted on the female end piece 2, while positioning the first section 5 in the first site 7 and the second section 5' in the third site 7" (FIGS. 2A and 2B—resting configuration—obtaining of a premounted, portable and manipulatable assembly);

passage from the resting configuration (separation E1) to the prestressed configuration for the clip 3 (separation E3 with E1<E3<E2). This operation can be performed advantageously by a robot that engages with the second appendage 9 and moves the part 6 against the elastic stress of the arms 3', 3" of the U, until positioning the second section 5' in the second site 7' (FIG. 2C);

mutual bringing together of a female end piece 2 with the prestressed clip 3 and a male end piece 4;

insertion of the male end piece 4 into the female end piece 2 leading to a separation of the arms 3', 3" beyond the prestressed configuration (separation E2>E3), then to an automatic elastic engagement (with the emitting of a noise) of said arms 3', 3" in the groove 4' of the male end piece 4. This instantaneous return to the resting configuration (separation E1) with locking of the fitting is facilitated by the flexible lip or finger 10 in the area of the first site 7 (attenuation of the rigidity on a lateral side of this site). The first section 5 remains in the first site 7, while the second section 5' is moved from the second site 7' to the third site 7" (FIGS. 4A and 4B); removal of the part 6 by pulling (FIG. 4C).

Of course, the invention is not limited to the embodiment described and represented in the accompanying drawings. Modifications remain possible, particularly from the viewpoint of the makeup of the various elements or by substitution of technical equivalents, without thereby going outside the field of protection of the invention.

The invention claimed is:

1. A system (1) for quick connection between a female end piece (2) and a male end piece (4) configured to be fitted into the female end piece (2), comprising:

a U-shaped locking clip (3), a wall of the female end piece (2) having opposite slits (2') through which arms (3', 3") of the U-shaped locking clip (3) protrude into a passage of said female end piece (2), and a wall of the male end piece (4) having an outer groove (4') configured to receive, with locking, said arms (3', 3") of the U-shaped locking clip (3) in a final fitted state of the male end piece (4) in the female end piece (2) when locked by said U-shaped locking clip (3), said arms (3', 3") of the U-shaped locking clip (3) each respectively having extending therefrom a free section (5, 5'), the free section of each one of said arms (3', 3") extending in a direction of the other one of said arms (3", 3'), the free sections (5, 5') of said arms (3', 3") together closing the U-shaped locking clip (3), said arms (3', 3") being separated elastically by the male end piece (4) during insertion of the male end piece (4) into the female end piece (2) until the U-shaped locking clip (3) is received in the outer groove (4') in the final fitted state, the U-shaped locking clip (3) when received in the outer groove (4') in the final fitted state being in a first resting configuration with the arms (3', 3") of the U-shaped locking clip (3) not forced apart; and an added prestressing part (6) configured as a removable prestressing element that removably engages with the U-shaped locking clip (3), the added prestressing part (6) comprising housing sites (7, 7', 7") configured to engage with the free sections (5, 5') of said arms (3', 3") in the first resting configuration of the U-shaped locking clip (3) and in a second prestressed configuration of the U-shaped locking clip (3) in which the arms (3', 3") of the U-shaped locking clip (3) are more spaced apart than when the U-shaped locking clip (3) is in the first resting configuration but less spaced apart than during passage of the U-shaped locking clip (3) over a maximum outer section of the male end piece (4), the housing sites (7, 7', 7") being arranged on the added prestressing part (6) such that during the insertion of the male end piece (4) into the female end piece (2), and before reaching the final fitted state, the U-shaped locking clip (3), prestressed by said added prestressing part (6), is automatically released to return to the first resting configuration.

2. The system according to claim 1, wherein the added prestressing part (6) comprises a plate having an edge (6') with a functional contour, and wherein the housing sites (7, 7', 7") comprise re-entrant formations or cutouts that receive, with removable clamping, ends (5") of the free sections (5, 5') of said arms (3', 3") of the U-shaped locking clip (3), the housing sites (7, 7', 7") having shapes at least partially matching those of said ends of the free sections of said arms (3', 3").

3. The system according to claim 2, wherein the added prestressing part (6) has at least one grasping formation or appendage (8, 9) enabling placement of the added prestressing part (6) on the U-shaped locking clip (3), removal of the added prestressing part (6) from the U-shaped locking clip (3), and movement of the added prestressing part (6) when engaged with the U-shaped locking clip (3), a passage of the U-shaped locking clip (3) from the first resting configuration of the U-shaped locking clip (3) to the second prestressed configuration of the U-shaped locking clip (3) taking place by forced movement of said added prestressing part (6) engaged with the U-shaped locking clip (3), and passage of the U-shaped locking clip (3) from the second prestressed configuration to the first resting configuration being accomplished automatically under an effect of an elastic return of said arms (3', 3") of the U-shaped locking clip (3) after separation of said arms (3', 3") beyond a separation imposed by the added prestressing part (6) in the second prestressed configuration.

4. The system according to claim 2, wherein the housing sites (7, 7', 7") of the added prestressing part (6) include
   a first housing site (7) that receives, with elastic locking and wedging, an end (5") of a first (5) one of the free sections of the U-shaped locking clip (3),
   a second housing site (7') that receives, with forced wedging under an elastic stress of the U-shaped locking clip (3) in a prestressed state, an end (5") of a second (5') one of the free sections of the U-shaped locking clip (3) in the prestressed state, and
   a third housing site (7") that receives, with a loose hooking, an end (5") of the second (5') one of the free sections of the U-shaped locking clip (3) in the first resting configuration of the U-shaped locking clip (3), the third housing site (7") being farther from the first housing site (7) than the second housing site (7').

5. The system according to claim 1, wherein the added prestressing part (6) has at least one grasping formation or appendage (8, 9) enabling placement of the added prestressing part (6) on the U-shaped locking clip (3), removal of the added prestressing part (6) from the U-shaped locking clip (3), and movement of the added prestressing part (6) when engaged with the U-shaped locking clip (3), a passage of the U-shaped locking clip (3) from the first resting configuration of the U-shaped locking clip (3) to the second prestressed configuration of the U-shaped locking clip (3) taking place by forced movement of said added prestressing part (6) engaged with the U-shaped locking clip (3), and passage of the U-shaped locking clip (3) from the second prestressed configuration to the first resting configuration being accomplished automatically under an effect of an elastic return of said arms (3', 3") of the U-shaped locking clip (3) after separation of said arms (3', 3") beyond a separation imposed by the added prestressing part (6) in the second prestressed configuration.

6. The system according to claim 5, wherein the housing sites (7, 7', 7") of the added prestressing part (6) include
   a first housing site (7) that receives, with elastic locking and wedging, an end (5") of a first (5) one of the free sections of the U-shaped locking clip (3),
   a second housing site (7') that receives, with forced wedging under an elastic stress of the U-shaped locking clip (3) in a prestressed state, an end (5") of a second (5') one of the free sections of the U-shaped locking clip (3) in the prestressed state, and
   a third housing site (7") that receives, with a loose hooking, an end (5") of the second (5') one of the free sections of the U-shaped locking clip (3) in the first resting configuration of the U-shaped locking clip (3), the third housing site (7") being farther from the first housing site (7) than the second housing site (7').

7. The system according to claim 1, wherein the housing sites (7, 7', 7") of the added prestressing part (6) include
   a first housing site (7) that receives, with elastic locking and wedging, an end (5") of a first (5) one of the free sections of the U-shaped locking clip (3),
   a second housing site (7') that receives, with forced wedging under an elastic stress of the U-shaped locking clip (3) in a prestressed state, an end (5") of a second (5') one of the free sections of the U-shaped locking clip (3) in the prestressed state, and
   a third housing site (7") that receives, with a loose hooking, an end (5") of the second (5') one of the free sections of the U-shaped locking clip (3) in the first resting configuration of the U-shaped locking clip (3), the third housing site (7") being farther from the first housing site (7) than the second housing site (7').

8. The system according to claim 7, wherein the first (5) one of the free sections is held in the first housing site (7) by a deformable contour part (10) of said first housing site (7).

9. The system according to claim 8, wherein the deformable contour part (10) of said first housing site (7) is a cutout plate portion forming a flexible lip or finger elastically retaining the end of the first (5) one of said free sections in said first housing site (7), by narrowing an opening (12) of said first housing site (7).

10. The system according to claim 1, wherein the added prestressing part (6) is formed as a plate in one piece, a body (6") of the plate having, on a first side, an edge (6') that has a functional contour that incorporates the housing sites (7, 7', 7") of the added prestressing part (6), a first grasping appendage (8) for placement and removal of said added prestressing part (6) by an operator, and a second grasping appendage (9) for movement of said added prestressing part (6) by a robotic arm.

11. The system according to claim 10, wherein the first grasping appendage (8) comprises a pictogram that includes interfacing areas (8') for fingers that facilitate a removal operation by pulling.

12. The system according to claim 1, wherein the added prestressing part (6) is formed as a plate in one piece molded from thermoplastic or thermoset material, a body (6") of the plate having, on a first side, an edge (6') that has a functional contour that incorporates the housing sites (7, 7', 7") of the added prestressing part (6), a first grasping appendage (8) for placement and removal of said added prestressing part (6) by an operator, and a second grasping appendage (9) for movement of said added prestressing part (6) by a robotic arm.

13. An element (11) forming a fluid circulation circuit, comprising:
   a female end piece (2) configured to be connected by fitting to a male end piece (4) of another element (11') of said circuit, said female end piece (2) being equipped with a U-shaped locking clip (3) for locking a connection between the female end piece (2) with the male end piece (4) in a mutual final fitted state; and
   a removable prestressing part (6), said removable prestressing part (6) formed as a plate configured to be engaged with the U-shaped locking clip (3) mounted on the female end piece (2), and comprising housing sites (7, 7', 7") that are configured to engage with free sections (5, 5') extending from two arms (3', 3") of the U-shaped locking clip (3), in such a way as to define with the U-shaped locking clip (3) a first resting configuration corresponding to a configuration that locks the quick connection system (1) in a final fitted state of the female end piece with the male end piece, as well as at least a second prestressed configuration of the U-shaped locking clip (3) in which the two arms (3', 3") of the U-shaped locking clip (3) are more separated than in the first resting configuration but less separated than during passage of a maximum outer section of the male end piece (4) during insertion into the female end piece (2), the housing sites (7, 7', 7") being arranged on the added prestressing part (6) such that during the insertion of the male end piece (4) into the female end piece (2), and before attaining the final fitted state, the U-shaped locking clip (3), prestressed by said removable prestressing part (6), is automatically released to return to the first resting configuration.

\* \* \* \* \*